(12) United States Patent
Song et al.

(10) Patent No.: US 10,850,637 B2
(45) Date of Patent: Dec. 1, 2020

(54) ELECTRIFIED RAILWAY POWER GRID SYSTEM WITHOUT NEGATIVE SEQUENCE IN WHOLE PROCESS AND WITHOUT POWER SUPPLY NETWORKS AT INTERVALS

(71) Applicant: JILIN UNIVERSITY, Jilin (CN)

(72) Inventors: Yuquan Song, Jilin (CN); Xiaofang Guan, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 663 days.

(21) Appl. No.: 15/504,296

(22) PCT Filed: Aug. 13, 2015

(86) PCT No.: PCT/CN2015/086817
§ 371 (c)(1),
(2) Date: Aug. 10, 2018

(87) PCT Pub. No.: WO2016/026404
PCT Pub. Date: Feb. 25, 2016

(65) Prior Publication Data
US 2018/0345822 A1 Dec. 6, 2018

(30) Foreign Application Priority Data
Aug. 19, 2014 (CN) .......................... 2014 1 0409606

(51) Int. Cl.
*B60M 1/22* (2006.01)
*B60L 1/00* (2006.01)
(Continued)

(52) U.S. Cl.
CPC ................. *B60M 1/22* (2013.01); *B60L 1/00* (2013.01); *B60L 5/18* (2013.01); *B60L 9/24* (2013.01);
(Continued)

(58) Field of Classification Search
CPC .......... B60M 1/22; B60M 3/00; B60M 7/003; B60L 50/53; B60L 1/00; B60L 5/18;
(Continued)

(56) References Cited

U.S. PATENT DOCUMENTS

| 5,293,947 A | * | 3/1994 | Stratton | ................... | B60K 6/46 |
| | | | | | 180/2.1 |
| 5,788,033 A | | 8/1998 | Luecking | | |

(Continued)

FOREIGN PATENT DOCUMENTS

| CN | 101073994 | 11/2007 |
| CN | 201077368 Y | 6/2008 |

(Continued)

OTHER PUBLICATIONS

Wikipedia—China Railway CRH1 (edited Jun. 2020) (Year: 2020).*

(Continued)

*Primary Examiner* — Mark T Le
(74) *Attorney, Agent, or Firm* — Workman Nydegger; Michael J. Frodsham

(57) ABSTRACT

An electrified railway power supply system without negative sequence in the whole process and without power supply networks at intervals, can comprise an external power supply system, an input power supply system from external to internal, and an internal power supply system. For external power supply, single-phase power supply is changed to double-phase power supply, and power of a single phase is input to the power supply system within the train via a contactor on a left arm and a right arm of a double-phase pantograph. No neutral section for passing of phase separation is provided in the whole process of operation, and a plurality of sections in the whole process are provided with no power supply network at intervals, and the motor train unit can operate normally without mechanical support for the power supply network.

7 Claims, 6 Drawing Sheets

(51) Int. Cl.
    *B60L 9/24*     (2006.01)
    *B60L 50/53*     (2019.01)
    *B60M 3/00*     (2006.01)
    *B60L 5/18*     (2006.01)
    *B60M 7/00*     (2006.01)

(52) U.S. Cl.
    CPC ............... *B60L 50/53* (2019.02); *B60M 3/00* (2013.01); *B60L 2200/26* (2013.01); *B60M 7/003* (2013.01)

(58) Field of Classification Search
    CPC ...... B60L 9/24; B60L 5/36; B60L 9/00; B60L 5/08; B60L 5/24; B60L 5/00
    See application file for complete search history.

(56) References Cited

U.S. PATENT DOCUMENTS

| | | | |
|---|---|---|---|
| 8,217,799 B2* | 7/2012 | Gori | B60M 1/04 340/668 |
| 2012/0032533 A1* | 2/2012 | Kawamura | B60L 9/22 307/327 |

FOREIGN PATENT DOCUMENTS

| | | |
|---|---|---|
| CN | 101503064 A | 2/2009 |
| CN | 101746282 A | 3/2010 |
| CN | 201712489 | 1/2011 |
| CN | 202319965 | 11/2012 |
| CN | 104210385 | 12/2014 |
| EP | 0769407 | 3/2000 |
| JP | 2003319505 A | 11/2003 |
| JP | 3917118 | 5/2007 |
| JP | 4916456 | 4/2012 |
| WO | WO2009133608 A1 | 11/2009 |

OTHER PUBLICATIONS

International Search Report for application No. PCT/CN2015/086817 dated Oct. 10, 2015.

Chinese Office Action and Search Report for application No. 201410409606.0, dated Dec. 17, 2015.

Russian Office Action and Search Report for application No. 2017108943, dated Jul. 11, 2018.

* cited by examiner

ELECTRIFIED RAILWAY POWER GRID SYSTEM WITHOUT NEGATIVE SEQUENCE IN WHOLE PROCESS AND WITHOUT POWER SUPPLY NETWORKS AT INTERVALS

CROSS-REFERENCE TO RELATED APPLICATIONS

The present invention is a 35 U.S.C. § 371 U.S. National Stage Application corresponding to PCT Application No. PCT/CN2015/086817, filed on Aug. 13, 2015, which claims priority to Chinese Patent Application No. 201410409606.0, filed Aug. 19, 2014. The entire content of each of the aforementioned patent applications is incorporated herein by reference.

FIELD OF THE INVENTION

A traction power supply system is a power source that ensures safe, stable and efficient operation of high-speed trains, which is responsible for stable, continuous and reliable power supply to a high-speed motor train unit, and is a kind of important infrastructure of electrified railways. The electrified railway power grid system of the present invention adopts a power supply system without negative sequence in the whole process, especially contacting in sections at intervals, and without support power networks in intermittent sections. The present invention greatly simplifies a support structure of electrified railways power network and is an important innovation that is material-saving, safe and highly reliable.

BACKGROUND OF THE INVENTION

An external power supply system of existing electrified high-speed railways mainly consists of traction substations, and a plurality of traction substations are provided along one electrified high-speed railway. The core equipment of the traction substation is a traction transformer, which boosts three-phase power generated by a power plant or step-downs a three-phase high-voltage utility power to 110 KV (220 KV for a high-speed electrified railway), and then converts it to 27.5 KV (the rated voltage is 25 KV) single-phase industrial frequency AC power, to supply two single-phase power lines of an overhead contact system to an upline and a downline of a railway, respectively. As a single-phase power supply system is simple in structure, low in construction cost, and convenient to use and maintain, single-phase industrial frequency AC power is generally used in the existing electrified trains, as shown in FIG. 5.

To support the load of a single-phase traction power network, a complicated mechanical support structure must be provided. A mechanical support for a single-phase power supply network is formed by an arrangement of a plurality of tension lengths (anchor sections). Tension lengths are connected to each other by catenaries, and tension length supports are used for bearing all the weight of the contact power supply network, and fixing conductor wires of the power supply network to a set position and height. Each tension length comprises anchor compensation devices, a plurality of positioners for cantilever (cantilever positioning devices), an electric connection device, hanger devices, a mid-tension length structure and an overhead crossing (frog) device. The anchor compensation devices are arranged at two ends of each tension length, are mounted at an upper part of the tension length support, and connect two ends of the catenaries and contact wires of each span of the overhead contact system, to automatically adjust the sag of the catenaries and the contact wires and ensure the tension of the catenaries/contact wires. Each tension length is provided with a plurality of positioners for cantilever and hanger devices. The spacing between every adjacent two positioners for cantilever for each tension length is 35-45 m. The positioners for cantilever are mounted at the upper part of the tension length support, for supporting the hangers, and position the contact wires, the catenaries and the hangers within a designed space, and transfer the load of the hangers to the support. A junction part of two adjacent tension lengths is known as tension length joint, which is basically required to allow smooth transition of a pantograph of an electrified train from one tension length to another, and be in good contact and draw currents normally. The spacing between every adjacent two hanger devices for each tension length is 7.5-8.5 m. The hanger devices are mounted between the catenaries and the contact wires. Connecting the ends of the catenaries or the contact wires to the support is called anchoring, and the weight of the contact wires is transferred to the catenaries. Through adding suspension points of the contact wires, the current draw quality of the pantograph of the electrified railway can be improved. The overhead crossing is provided between the anchor compensation device and the mid-tension length structure, and located between the two contact wires above a rail turnout of the electrified railway, to ensure smooth transition of the pantagraph from one contact wire to the other and achieve substantially equal heights of the two contact wires at start contact points to achieve shifting. A mid-tension length structure is provided in the middle of each tension length. In tension lengths of the overhead contact system with compensation at both ends, fixation must be carried out at a central location of each tension length. The contact wires are fixed to the catenaries through mid-anchor clamps and auxiliary ropes, so as to prevent the hangers from moving toward any of them to ensure uniform tension of the catenaries/contact wires and improve contact relation between the panographs and the overhead contact system, and for preventing break of the catenaries/contact wires of the overhead contact system and controlling the damage to the overhead contact system after break to a certain extent. The electric connection device is provided on an inner side of the anchor compensation device, and located between the anchor compensation device and the mid-tension length structure, for connecting electric circuits of the contact wires of every section for power supply to ensure conduction of electric circuitry. A support device is composed of a cantilever, a draw bar (or pressing tube) and an insulator, to make the hangers support all the equipments of the overhead contact system and transfer the load to the support. Positioning devices include positioning tubes, locators and supports, for fixing the overhead contact system to a specified position away from the line center, so that the overhead contact system does not exceed an allowed operation range of the pantographs and the wear is uniform between the pantographs.

To support all load of the traction power network safely, a complicated mechanical support structure must be provided. Thus, a large amount of financial, material and human resources are needed in order to achieve machining and manufacture installation and debugging of accompanying parts and components, as well as project construction, routine maintenance and the like. To simplify or partially reduce the mechanical support structure, the electrified railway power grid system is required to mainly consist of an external power supply system, an input power supply system from external to internal, and an internal power supply system. In order to solve the problem that in the whole process of the high-voltage special power network, passing of phase separation is not required, and a negative sequence current should not be caused, the inventor has filed Chinese patent applications for invention of 201410182358.0 and 201410239724.1, which are incorporated herein by reference in their entirety. Due to difference arrangement sequences of eight-carriage motor train units of CRH1 type, CRH2 type, CRH3 type and CRH5 type in high-speed railways of China and different placement positions of pantographs on train tops, Chinese patent application for invention of 201410182358.0 is an innovative design mainly for eight-carriage motor train units of CRH2 type and CRH3 type, and Chinese patent application for invention of 201410239724.1 is an innovative design mainly for eight-carriage motor train units of CRH1 type and CRH5 type. The two patent applications for invention are common in that the single-phase power output from the secondary side of the traction transformer is improved to double-phase power; the single-phase pantograph is improved to the double-phase pantograph; cutoff switches of central sections or insulators of central sections are not provided; two lines (paths) of single-phase power are input to two double-phase cut-off switches via two slide contactors on upper ends of a pantograph, and then respectively connected to two basic units within the motor train unit via double-phase cut-off switches; and the two basic units are independent and insulated from each other, with identical circuit structures. Hence, no neutral section for passing of phase separation is provided in the whole power supply network, and a negative sequence current is not caused in the three-phase special power network.

Although the above-mentioned two patent applications for invention solve the problem that passing of a phase-separation system is not required in the whole power supply network and a negative sequence current should not be caused, there is an imperative need to solve the problem of a complex mechanical support structure for supporting the traction power network.

SUMMARY OF THE INVENTION

In view of the above, the present invention provides an electrified railway power grid system without negative sequence in the whole process and without power supply networks at intervals, mainly consisting of an external power supply system, an input power supply system from external to internal, and an internal power supply system.

The three parts, that is, the external power supply system, the input power supply system from external to internal, and the internal power supply system of the present invention are described below respectively.

In the external power supply system, one facility is provided for an upline and a downline of a railway respectively, and thus two facilities are provided, the two facilities are parallel and symmetrical to each other, and the two facilities are identical. A row of tension length supports are provided for any of the upline and the downline, and a plurality of positioners for cantilever are provided at upper parts of the tension length supports; two catenaries parallel to each other are fixed to each positioner for cantilever, each catenary is fixedly connected to one end of a hanger, and the other end of the hanger is connected to a power supply contact wire. The two catenaries, the two hangers and the two power supply contact wires are parallel to each other and mutually insulated to ensure shorting never occurs. The hanger is arranged between the catenary and the power supply contact wire, and transfers all load of the power supply contact wire to the catenary, through which the load is transferred to the tension length support. The spacing between every adjacent two positioners for cantilever, among the cantilevers of a tension length, is preferably 35-45 m, the spacing between every adjacent two hangers for each tension length is preferably 7.5-8.5 m. Three-phase (A, B and C) high-voltage special power of 110 KV (220 KV for high-speed trains) is input to a primary side of a traction transformer S, and two lines of single-phase power α and β of 27.5 KV (the rated voltage is 25 KV) are output from a secondary side of the traction transformer S, the single-phase power α and the single-phase power β are respectively connected to the two single-phase contact wires.

In the input power supply system from external to internal, single-phase pantographs are improved to double-phase pantographs, and the double-phase pantographs are provided on corresponding train tops of a motor train unit. The two lines of single-phase power are input to double-phase cut-off switches K1α and K1β or K2β and K2α via slide contactors α' and β' provided on a left arm La and a right arm Ra of the double-phase pantograph respectively, and double-phase cut-off switches K1α and K1β or K2β and K2α are respectively connected to basic units TUB1 and TUB2 within the motor train unit respectively. Insulators are provided between the left arm La and the right arm Ra of the double-phase pantograph, to ensure good insulation between the two arms.

In the internal power supply system, motive power supply and auxiliary power supply of any eight-carriage motor train unit are configured for a basic unit TUB1, and a train-mounted battery of any motor train unit is configured as a basic unit TUB2. When the double-phase pantograph T1 rises, the double-phase pantograph T2 must fall, and when the double-phase pantograph T1 needs to rise, firstly the double-phase cut-off switches K2α and K2β are turned off, and the double-phase cut-off switches K1α and K1β are turned on. The phase α of the double-phase cut-off switches K1α is responsible for power supply of the basic unit TUB1 of motive power supply and auxiliary power supply, and the phase β of the double-phase cut-off switches K1β is responsible for power supply of the basic unit TUB2 of the train-mounted battery. The basic units TUB1 and TUB2 are two basic units that are independent from each other, mutually insulated and same in structure.

The present invention combines technical innovations of the external power supply system, the input power supply system from external to internal, and the internal power supply system. The motor train unit successively runs through a plurality of travel sections including travel sections $L_{11}$, $L_{12}$, $L_{21}$, $L_{22}$, $L_{32}$ and the like during operation. When the motor train unit runs into the travel section $L_{11}$, the double-phase pantograph T1 rises, the double-phase pantograph T2 falls, the slide contactor α' on the left arm of the double-phase pantograph T1 is connected to the basic unit TUB1 of auxiliary power supply and motive power supply of the motor train unit, and the slide contactor β' on the right arm of the double-phase pantograph T1 is connected to the basic unit TUB2 of the train-mounted battery. When the motor train unit runs into the travel section $L_{21}$, the double-phase pantograph T2 rises, the double-phase pantograph T1 falls, the slide contactor α' on the right arm of the double-phase pantograph T2 is connected to the basic unit TUB2 of the train-mounted battery, and the slide contactor β' on the left arm of the double-phase pantograph T2 is connected to the basic unit TUB1 of auxiliary power supply and motive power supply of the motor train unit. As the single phase α and the single phase β independently and alternately draw power from A, B and C of the three-phase high-voltage special power network in sections at intervals, the power of the single phase α and the power of the single phase β can be symmetrically adjusted automatically. Thus, the two single-phase power lines are not provided with a neutral section for passing of phase separation, and a negative sequence current is not caused in the three-phase high-voltage power network. When the motor train unit runs into the travel section $L_{12}$, $L_{22}$ or $L_{32}$, both the double-phase pantographs T1 and T2 fall, and operation of the motor train unit in the travel section $L_{12}$ completely relies on electric energy stored in the travel section $L_{11}$; operation of the motor train unit in the travel section $L_{22}$ completely relies on electric energy stored in the travel section $L_{21}$; and operation of the motor train unit in the travel section $L_{32}$ completely relies on electric energy stored in the travel section $L_{31}$. Thus, in these sections, an overhead contact system for power supply is not required, and the train-mounted battery can supply power to keep operation of the motor train unit, and of course a support structure for the power supply network is not required, to achieve the objective of the present invention.

None of the travel sections $L_{12}$, $L_{22}$ and $L_{32}$ is provided with a traction power (supply) network, so tunnels, viaducts, station yards, culverts and the like can be intentionally set in these certain travel sections in line designing. Thus the tunnels, viaducts, station yards, culverts and the like are intentionally provided in the travel sections $L_{12}$, $L_{22}$ or $L_{32}$ in line designing. Many traction transformers can be saved in construction of the tunnels, viaducts, station yards, culverts and the like of the railway, and a lot of materials, machined parts and components and maintenance costs are saved in the support structure of the power supply network, and the safety of the railway is improved.

In addition, the single-phase pantograph on the upline or the downline at the output of the traction transformer is improved to the double-phase pantograph, and the slide contactors α' and β' are respectively provided on the upper end of the left arm and the upper end of the right arm of the double-phase pantograph, and are respectively in good slide contact with the power of the single-phase α and the power of the single-phase β output by the traction transformer. Good insulation between the left arm and the right arm of the pantograph is achieved by insulators $M_1$ and $M_2$. With the original single-phase contact pantograph improved to the double-phase contact pantograph, this has the advantages of stable and smooth mechanical contact, and more reliable and stable electric energy transmission, as compared with contact power reception with only one single-phase contactor provided in the middle of the pantograph. Large-current dropping resistors $R_\alpha$ and $R_\beta$ of 200Ω-1800 Ω are provided at start points and end points of the two contact power supply wires of the single-phase power α and β. At the moment the motor train unit runs into contact with or away from the contact power supply network, as the large-current resistors cause continuous decrease or increase of the voltage, a current spark due to instantaneous increase or decrease of the voltage is not generated. The upline and the downline of the railway may also be configured to be a support structure in three-line arrangement. The tension length supports and the positioners for cantilever on lateral sides of the upline and the downline are designed into L-type, and the tension length supports and the positioners for cantilever arranged between the upline and the downline may be designed into be T-type, which not only saves the cost of project construction, and also improves the stability, reliability and safety of the support structure of the special power network.

The present invention has the following beneficial effects:

1. Cantilevers are fixed to upper parts of the tension length supports, and two catenaries mutually insulated and parallel to each other are fixed to the cantilever. Each catenary is connected to an upper end of a hanger, and a lower end of the hanger is connected to a power supply contact wire. The two hangers and the two power supply contact wires are parallel to each other and mutually insulated. The two contact wires are respectively electrically connected to the power of the single-phase α and the power of the single-phase β output by the traction transformer. The power of the single-phase α and the power of the single-phase β are respectively in slide contact with the slide contactor α' and the slide contactor β' of the double-phase pantograph, and are input to the auxiliary power supply and motive power supply system and the train-mounted battery within the motor train unit via the double-phase cut-off switches K1α and K1β or K2α and K2β. As the power of the single-phase α and the power of the single-phase β respectively supply power to the basic unit TUB1 and the basic unit TUB2, the basic unit TUB1 and the basic unit TUB2 are mutually independent and symmetrical to each other. Therefore, no neutral section is provided, and a negative sequence current is not caused in the three-phase high-voltage power A, B and C.

2. In the travel sections where both the double-phase pantographs T1 and T2 fall, the electric energy stored by the train-mounted battery is sufficient for the motive power supply and auxiliary power supply of the motor train unit. Therefore, power supply from the single-phase α and single-phase β of the overhead contact system at the output end of the traction transformer is not needed. Neither a neutral section nor a support structure for the power supply network is required.

3. The original single-phase pantograph is changed to the double-phase pantograph, and as the slide contactor α' and the slide contactor β' of the pantograph are in slide contact with the power of the single-phase α and the power of the single-phase β, and the power of the single-phase α and the power of the single-phase β are parallel to and insulated from each other, the mechanical smoothness of slide contact of the pantograph, the transmission quality of electric energy and the reliability of power supply are improved.

4. Large-current dropping resistors $R_\alpha$ and $R_\beta$ (200Ω-1800Ω) are provided on the two ends of each travel section, and an instantaneous break or connection spark will not occur when the double-phase pantograph is instantaneously disconnected from or brought into contact with the power supply network via α and β.

5. When the double-phase pantograph T1 rises and the double-phase pantograph T2 falls, the left arm of the double-phase pantograph is connected to the power of the single phase α, and the right arm of the double-phase pantograph is connected to the power of the single phase β. When the double-phase pantograph T1 falls and the double-phase pantograph T2 rises, the left arm of the double-phase pantograph comes into contact with the single phase power β, and the right arm of the double-phase pantograph comes into contact with the single phase power α. This alternate contact power supply way can improve symmetry of drawing power from the three-phase high-voltage A, B and C.

6. As there is no power supply network and support facility thereof in some travel sections, sections of tunnels, viaducts, culverts, turnouts, station yards and the like can be provided in such travel sections, thus it can significantly save the construction costs, improve the traveling safety, and simplify the complexity of space power supply networks.

7. The upline and the downline of the railway may also be configured to be a support structure in three-line arrangement. The tension length supports and the positioners for cantilever on lateral sides of the upline and the downline are designed into L-type, and the tension length support and the positioners for cantilever arranged between the upline and the downline may be designed into be T-type, which not only saves the cost of project construction, but also improves the stability, reliability and safety of the support structure of the special power network.

BRIEF DESCRIPTION OF THE DRAWINGS

FIG. 6($b$) is a schematic diagram of grouping of CRH2-type motor trains;

FIG. 6($c$) is a schematic diagram of grouping of CRH3-type motor trains; and

FIG. 6($d$) is a schematic diagram of grouping of CRH5-type motor trains.

DETAILED DESCRIPTION OF THE EMBODIMENTS

Specific embodiments of the present invention will be further described below in conjunction with the accompanying drawings.

Figure 1:
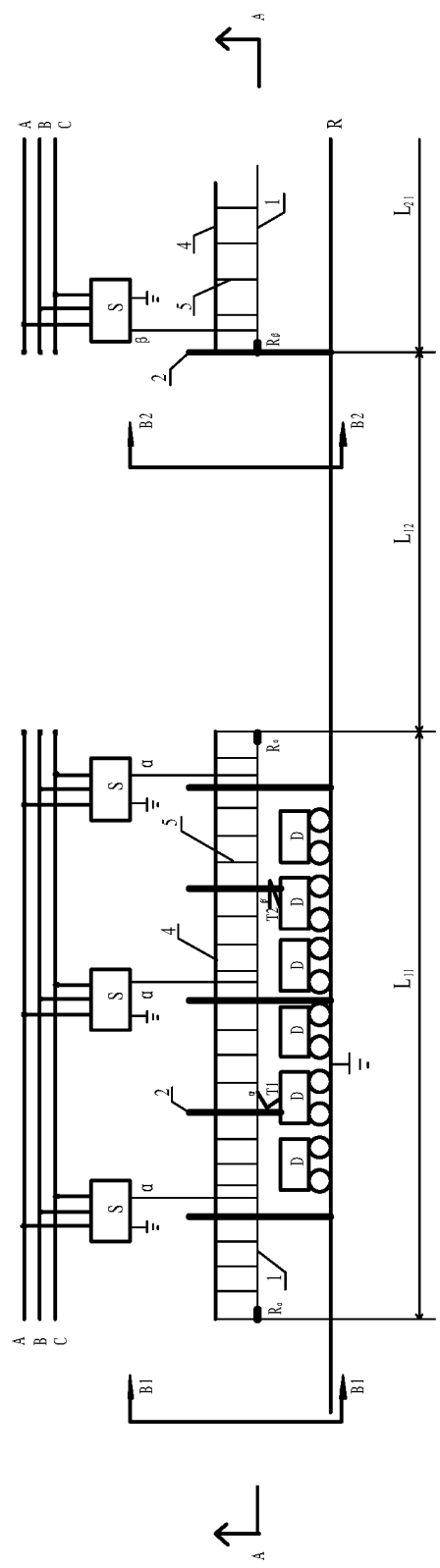
FIG. 1 is schematic front view of an electrified railway power grid system without negative sequence in the whole process and without power supply networks at intervals according to a preferred embodiment of the present invention.
Figure 2:
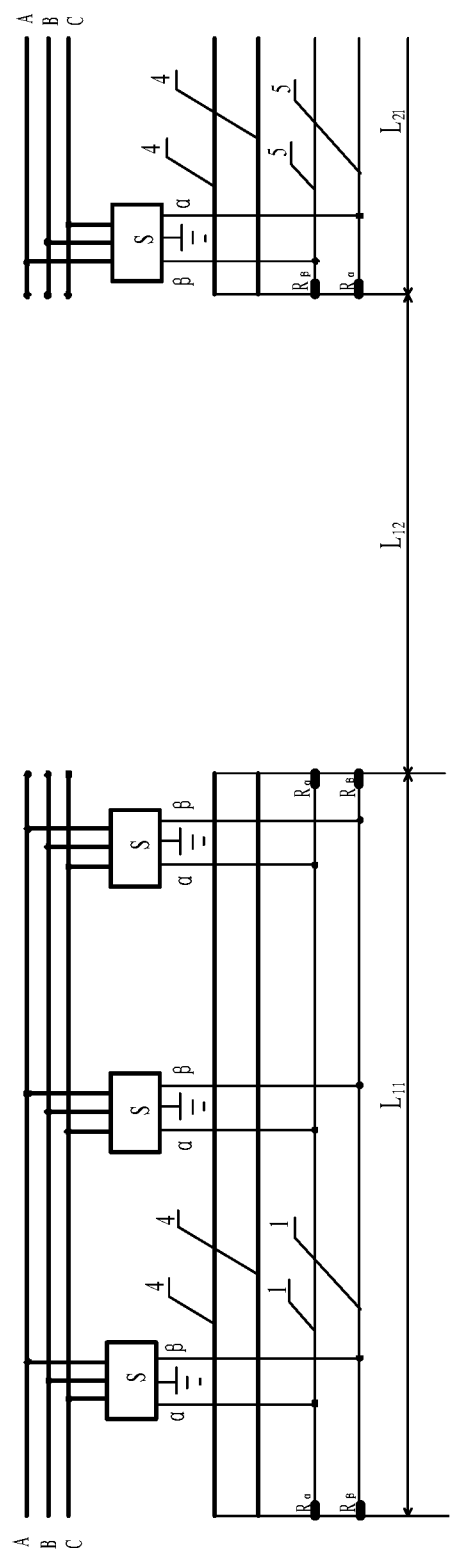
FIG. 2 is a schematic bottom view of FIG. 1.
Figure 3A:
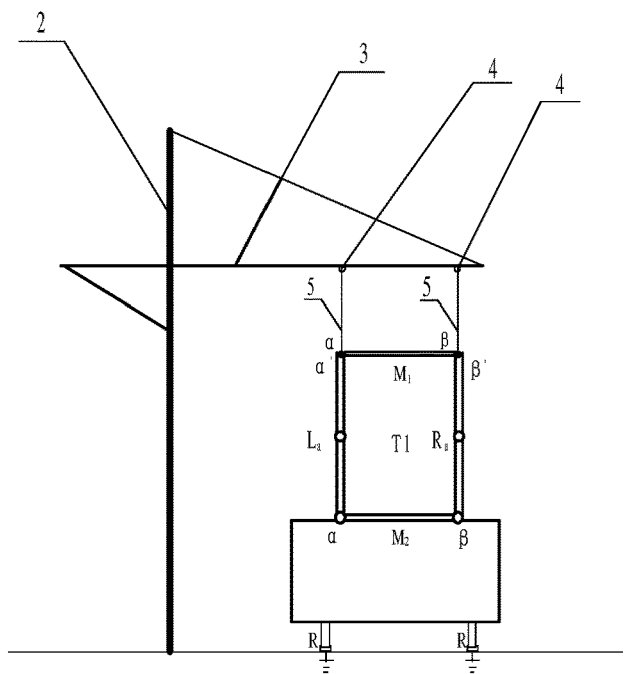
FIG. 3($a$) is a side view along line B1-B1 of FIG. 1, and FIG. 3($b$) is a side view along line B2-B2 of FIG. 1.
Figure 3B:
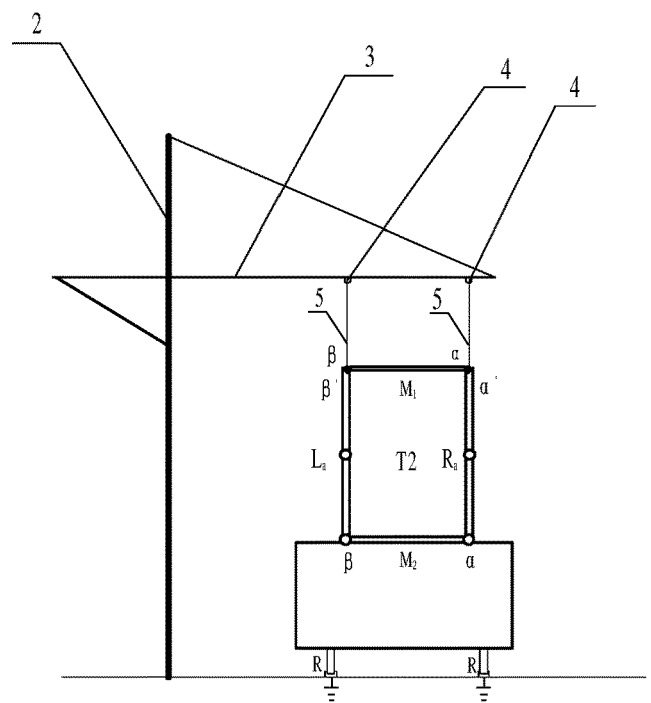

As shown in FIG. 1, an electrified railway power grid system without negative sequence in the whole process and without power supply networks at intervals according to a preferred embodiment of the present invention comprises tension length supports. Positioners for cantilever are fixed to upper parts of the tension length supports, and two parallel catenaries are fixed to each positioner for cantilever, with a distance of 1.94 m between the catenaries. Hangers are disposed between the catenaries and contact wires. The upper ends of the two parallel hangers are connected to the two catenaries, and the lower ends of the two hangers are connected to the two contact wires. The two parallel contact wires are respectively connected to two lines of single-phase power α and β output from a secondary side of a traction transformer S. Two line structures insulated from and parallel to each other are provided on an upline and a downline of a railway. Positioners for cantilever 3 are provided at upper parts of each row of tension length supports 2, and two catenaries 4 parallel to each other are fixed to each positioner for cantilever 3. Hangers 5 are provided between the catenaries 4 and the two single-phase power supply contact wires 1. The spacing between every adjacent two positioners for cantilever 3 for each tension length is 35-45 m. The spacing between every adjacent two hangers 5 for each tension length is 7.5-8.5 m. The spacing between the two parallel hangers on each positioner for cantilever 3 is not less than 1.94 m. The hangers 5 transfer all weights of the power supply contact wires 1 to the catenaries 4, and the catenaries 4 transfer all equipment load of the power supply contact wires 1 to the tension length supports 2. As shown in FIG. 2, three-phase (A, B and C) high-voltage special power of 110 KV (220 KV for high-speed trains) is input to a primary side of the traction transformer S, and two lines of single-phase power α and β of 27.5 KV (the rated voltage is 25 KV) are output from the secondary side of the traction transformer S. The single-phase power α and the single-phase power β are connected to the two power supply contact wires 1. Large-current dropping resistors $R_\alpha$ and $R_\beta$ of 200Ω-1800 Ω are provided at start points and end points of the two single-phase power supply wires, to avoid such phenomena as a break spark and ferromagnetic resonance due to instantaneous break. A support structure in three-line arrangement can be set for the upline and the downline of the railway, wherein the tension length supports and the cantilevers on lateral sides of the upline and the downline may be designed into L-type (L-shaped), and the tension length supports and the positioners for cantilever arranged between the upline and the downline may be designed into be T-type (T-shaped), which not only saves the cost of project construction, but also improves the stability, reliability and safety of the support structure of the special power network. As shown in FIG. 3, a double-phase pantograph T1 and a double-phase pantograph T2 are provided on corresponding train tops of a motor train unit. A slide contactor α' and a slide contactor β' are respectively provided on an upper end of a left arm La and an upper end of a right arm Ra of each double-phase pantograph. The slide contactor α' and the slide contactor β' are in good slide contact with the two single-phase power supply wires. Insulators $M_1$ and $M_2$ are provided between the left arm La and the right arm Ra of the double-phase pantograph. The spacing between the left arm La and the right arm Ra of the double-phase pantograph is not less than 1.94 m. Power is transferred from the slide contactor α' and the slide contactor β' to the power supply system inside the motor train unit via the left arm La and the right arm Ra of the double-phase pantograph, which has the advantages of stable and smooth mechanical contact, reduced wear of pantograph-catenary contact, more reliable electric energy transmission, and high quality of power supply, as compared with the case of only providing one single-phase contactor in the middle of the pantograph.

Figure 4:
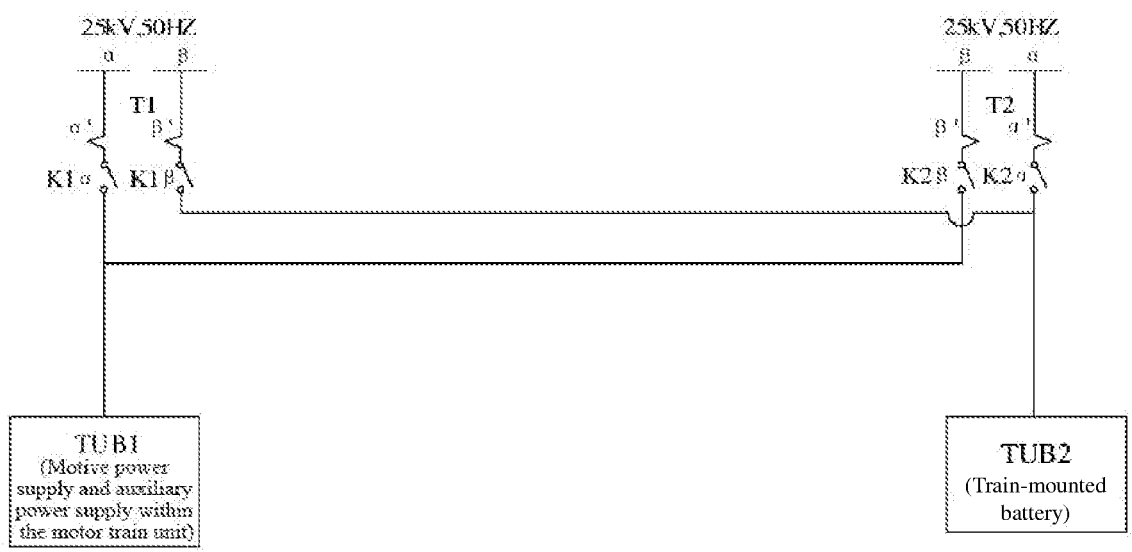
FIG. 4 is a schematic diagram of a motive power supply and auxiliary power supply load and a train-mounted battery of an eight-carriage motor train unit.
Figure 5:
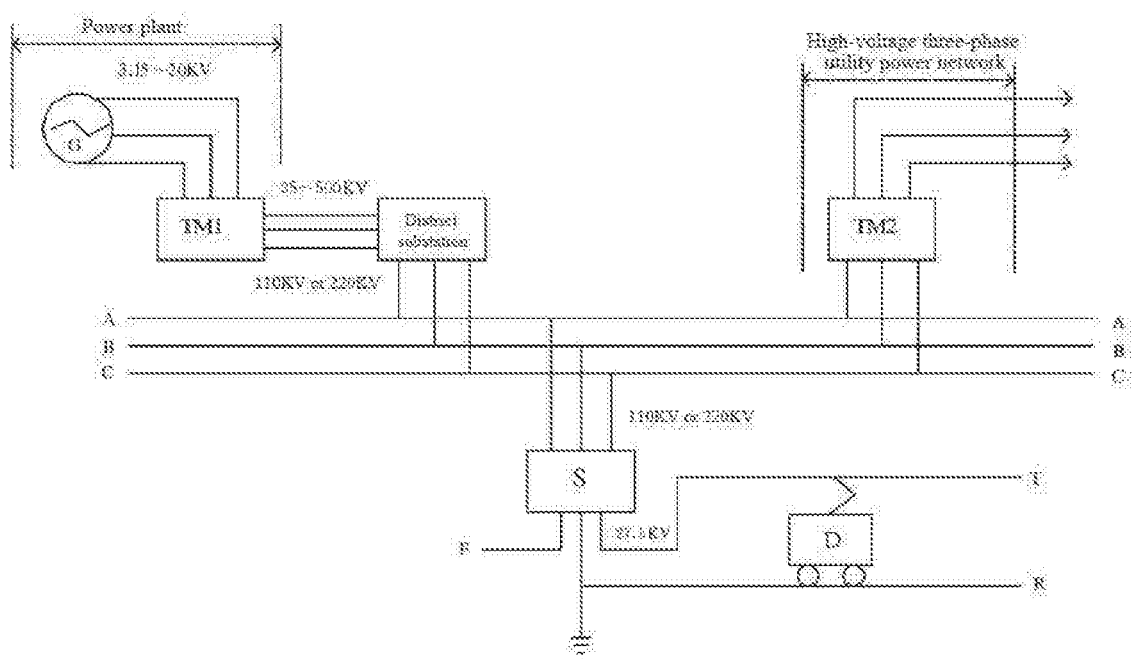
FIG. 5 is a schematic diagram of external single-phase power supply of an existing electrified railway.

As shown in FIG. 4, the two feeder lines of the single-phase power α and the single-phase power β are transferred from the slide contactor α and the slide contactor β to the power supply system inside the motor train unit via the left arm La and the right arm Ra of the double-phase pantograph; and the single-phase power α and the single-phase power β are connected to double-phase cut-off switches K1α and K1β, or are connected to double-phase cut-off switches K2α and K2β.

According to the present invention, the motor train unit will successively run through a plurality of travel sections including travel sections $L_{11}$, $L_{12}$, $L_{21}$ $L_{22}$, $L_{32}$ and the like during operation.

To sum up, when the motor train unit runs to the travel section $L_{11}$, the double-phase pantograph T1 rises, the double-phase pantograph T2 falls, the double-phase cut-off switch K2α and K2β are turned off, the double-phase cut-off switch K1α is connected to a basic unit TUB1 of motive power supply and auxiliary power supply within the motor train unit, and the double-phase cut-off switch K1β is connected to a basic unit TUB2 of a train-mounted (storage) battery. When the motor train unit runs into the travel section $L_{12}$ after passing the travel section $L_{11}$, electric energy stored by the train-mounted battery in the travel section $L_{11}$ is sufficient to provide the motive power supply and auxiliary power supply needed by the motor train unit in the travel section $L_{12}$, and both the double-phase pantographs T1 and T2 fall in the travel section $L_{12}$. When the motor train unit runs into the travel section $L_{21}$, the double-phase pantograph T1 falls, the double-phase pantograph T2 rises, the double-phase cut-off switch K1α and K1β are turned off, the double-phase cut-off switch K2α is connected to the basic unit TUB2 of the train-mounted battery, and the double-phase cut-off switch K2β is connected to the basic unit TUB1 of motive power supply and auxiliary power supply within the motor train unit; electric energy stored by the train-mounted battery in the travel section $L_{11}$ is sufficient to provide the motive power supply and auxiliary power supply needed for the travel section $L_{22}$; and both the double-phase pantographs T1 and T2 fall in the travel section $L_{22}$. When the motor train unit further runs into the travel section $L_{31}$, the double-phase pantograph T1 rises, the double-phase pantograph T2 falls, the double-phase cut-off switch K2α and K2β are turned off, the double-phase cut-off switch K1α is connected to the basic unit TUB1 of motive power supply and auxiliary power supply within the motor train unit, and the double-phase cut-off switch K1β is connected to the basic unit TUB2 of the train-mounted battery; electric energy stored by the train-mounted battery in the travel section $L_{31}$ is sufficient to provide the motive power supply and auxiliary power supply needed by the motor train unit in the travel section $L_{32}$; and both the double-phase pantographs T1 and T2 fall in the travel section $L_{32}$. By analogy, the double-phase pantograph T1 rises, the double-phase pantograph T2 falls, the double-phase pantograph T1 falls, and the double-phase pantograph T1 rises. Hence, the basic unit TUB1 and the basic unit TUB2 draw power from the power network alternately. According to the present invention, as the motive power supply and auxiliary power supply within the train are configured for the basic unit TUB1, and the train-mounted battery power supply is configured for the basic unit TUB2, the electric quantity needed for the motive power supply and auxiliary power supply within the train is just approximate to that needed for the train-mounted battery power supply. In respective sections, every time the double-phase pantograph T1 rises, the single-phase α is always connected to the basic unit TUB1, and the single-phase β is always connected to the basic unit TUB. Every time the double-phase pantograph T2 rises, if the single phase α is still connected to the basic unit TUB1, and the single phase β is still connected to the basic unit TUB2, an accumulated error will be added to the single phase α and the single phase β respectively because the electric quantity needed for the basic unit TUB1 is just approximate to that needed for the basic unit TUB2. In a three-phase power network, the accumulated error will add a negative sequence current to the three-phase power network due to asymmetry of single phase power. If the basic unit TUB1 and the basic unit TUB2 alternately draw power from the power network every time the double-phase pantograph T1 rises or the double-phase pantograph T2 rises, the negative sequence current caused by asymmetry of power drawing error accumulation will be reduced in the whole process. Evidently, the above problem is solved desirably in the present invention, whereby power supply imbalance of the three-phase high-voltage power network due to accumulation of electric quantity will not occur, and negative effect of the negative sequence current is reduced. In summary, when the motor train unit runs to the travel section $L_{12}$, $L_{22}$, $L_{32}$ or the like, both the double-phase pantographs T1 and T2 fall, and operation of the motor train unit in the travel section $L_{12}$ completely relies on the electric energy stored in the travel section $L_{11}$; operation of the motor train unit in the travel section $L_{22}$ completely relies on the electric energy stored in the travel section $L_{21}$; and operation of the motor train unit in the travel section $L_{32}$ completely relies on the electric energy stored in the travel section $L_{31}$. In the travel section $L_{12}$, $L_{22}$ and $L_{32}$, neither an overhead contact system (contact network) for power supply nor a support structure for the power supply network is required, and the motor train unit can continue operating normally completely relying on the electric energy stored by the train-mounted battery in the travel section $L_{11}$, $L_{22}$ and $L_{32}$. Thus, the design objective of no negative sequence current in the whole process and no power network support structure in sections of the invention can be achieved.

An exemplary application of the present invention in high-speed electrified trains is described below in conjunction with FIGS. 6(a)-6(d).

Figure 6A:
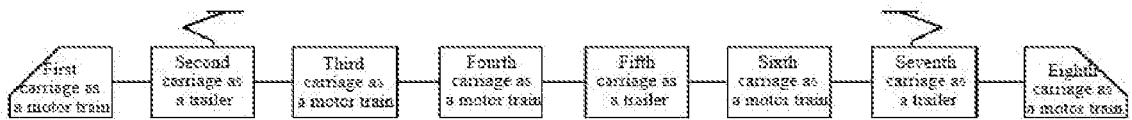
FIGS. 6($a$)-6($d$) are schematic diagram of arrangement sequences and placement positions of double-phase pantographs of four eight-carriage motor train units of different types, wherein FIG. 6($a$) is a schematic diagram of grouping of CRH1-type motor trains.
Figure 6B:
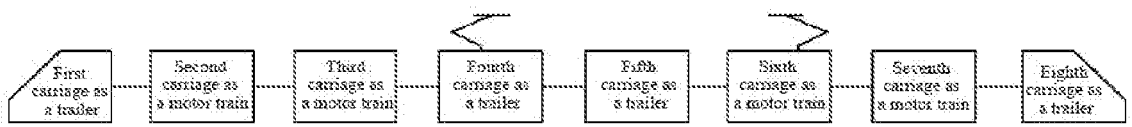
Figure 6C:
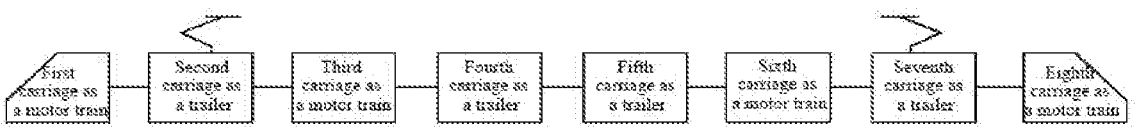
Figure 6D:
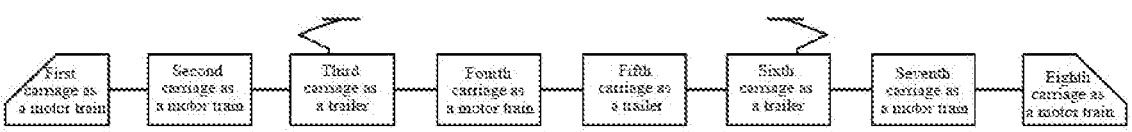

High-speed electrified trains in China at present are divided into four types, which are all eight-carriage motor train units. According to the present invention, single-phase pantographs originally provided on different train tops of a motor train unit are improved into double-phase pantographs. As shown in FIG. 6(a), double-phase pantographs of an eight-carriage motor train unit of CRH1-type are provided on tops of a second carriage as a trailer and a seventh carriage as a trailer. As shown in FIG. 6(b), double-phase pantographs of an eight-carriage motor train unit of CRH2-type are provided on tops of a fourth carriage as a trailer and a sixth carriage as a motor train. As shown in FIG. 6(c), double-phase pantographs of an eight-carriage motor train unit of CRH3-type are provided on tops of a second carriage as a trailer and a seventh carriage as a trailer. As shown in FIG. 6(d), double-phase pantographs of an eight-carriage motor train unit of CRH4-type are provided on tops of a third carriage as a trailer and a sixth carriage as a trailer. When the double-phase pantograph T1 rises, the double-phase pantograph T2 must fall, or when the double-phase pantograph T1 falls, the double-phase pantograph T2 must rise. The two lines of single-phase power α and single-phase power β output from the secondary side of the traction transformer S pass through the slide contactor α' and the slide contactor β' on the upper end of the left arm La and the upper end of the right arm Ra of the double-phase pantograph respectively, and are input into the motor train unit via the double-phase cut-off switch K1α and K1β or K2α and K2β.

The present invention is described above in detail in conjunction with specific embodiments. Apparently, what is described above and shown in the drawings should be interpreted as exemplary rather than limiting the present invention. To those skilled in the art, upon reading the present invention, apparently various variations or modifications can be made to the features described therein or combinations thereof, and all these variations or modifications should be encompassed within the protection scope of the present invention.

LIST OF REFERENCE SIGNS

A, B, C: three-phase high-voltage special power network
D: motor train
F: feeder line
G: generator
R: rail
S: traction transformer
T: overhead contact system
$\alpha, \beta$: two lines of single-phase power
T1, T2: double-phase pantograph
TM1: boosting transformer
TM2: step-down transformer
K1$\alpha$, K1$\beta$ and K2$\alpha$, K2$\beta$: double-phase cut-off switch
$R_\alpha$ and $R\beta$: large-current dropping resistor
$\alpha'$ and $\beta'$: slide contactors on an upper end of a left arm La and an upper end of a right arm Ra
M1, M2: insulator between the left arm La and the right arm Ra
1: power supply contact wire
2: tension length support
3: positioner for cantilever
4: catenary
5: hanger

The invention claimed is:

1. An electrified railway power grid system comprising:
an external power supply system;
an input power supply system from external to internal; and
an internal power supply system;
wherein the external power supply system comprises a first facility provided for an upline of a railway and a second facility provided for a downline of the railway;
wherein the first and second facilities are parallel and symmetrical to each other;
a plurality of positioners for cantilever provided at upper parts of a row of tension length supports, and two catenaries parallel to each other being fixed to each positioner;
wherein each catenary is fixedly connected to one end of a hanger, and the other end of the hanger is connected to a power supply contact wire;
wherein the two catenaries, connected hangers and power supply contact wires are parallel to each other and mutually insulated so as to prevent shorting;
wherein the hangers are arranged between the catenaries and the power supply contact wires, and wherein the hangers are configured to transfer loads of the power supply contact wires to the catenaries, through which the loads are transferred to the tension length support;
wherein in the input power supply system from external to internal, and first and second double-phase pantographs are provided on corresponding train tops of an eight-carriage motor train unit;
wherein first and second slide contactors are respectively provided on an upper end of a left arm and an upper end of a right arm of each double-phase pantograph;
wherein power of a first single-phase and power of a second single-phase from a secondary side of a traction transformer are connected to a first set and second set of double phase cut-off switches via the first and second slide contactors and input to the internal power supply system;
wherein in the internal power supply system, a motive power supply and an auxiliary power supply of an eight-carriage motor train unit are configured for a first basic unit, and a train-mounted battery of a motor train unit is configured as a second basic unit;
wherein the motor train unit is configured to successively run through a plurality of travel sections during operation;
wherein when the first double-phase pantograph needs to rise, the second set of double-phase cut-off switches are turned off, and the first set of double-phase cut-off switches are turned on, so that a first phase of the first set of double-phase cut-off switches is responsible for power supply of the first basic unit of the motive power supply and the auxiliary power supply, and a second phase of the first set of double-phase cut-off switches is responsible for power supply of the second basic unit of the train-mounted battery;
wherein when the motor train unit runs into a first travel section, the first double-phase pantograph rises, the second double-phase pantograph falls, the first slide contactor on the left arm of the first double-phase pantograph is connected to the first basic unit of the auxiliary power supply and the motive power supply of the motor train unit, and the second slide contactor on the right arm of the first double-phase pantograph is connected to the second basic unit of the train-mounted battery;
wherein when the motor train unit runs into a third travel section, the second double-phase pantograph rises, the first double-phase pantograph falls, the first slide contactor on the right arm of the second double-phase pantograph is connected to the second basic unit of the train-mounted battery, and the second slide contactor on the left arm of the second double-phase pantograph is connected to the first basic unit of the auxiliary power supply and the motive power supply of the motor train unit; and
as the first single phase and the second single phase draw power from a three-phase high-voltage power network independently at intervals, and the first and second double-phase pantographs rise or fall alternately, the first single phase and the second single phase can be symmetrically adjusted automatically, and thus two single-phase power lines are not provided with a neutral section for passing of phase separation, and a negative sequence current is not caused in the three-phase high-voltage power network.

2. The electrified railway power grid system of claim 1, wherein:
the first single phase and the second single phase draw power from the three-phase high-voltage power network independently at intervals, and the first and second double-phase pantographs rise or fall alternately; and
the first single phase and the second single phase will not cause an increase of an accumulated negative sequence current in the three-phase high-voltage power network.

3. The electrified railway power grid system of claim 1, wherein, when the motor train unit runs into a second travel section, a fourth travel section or a sixth travel section:
both the first and second double-phase pantographs fall, and operation of the motor train unit in the second travel section completely relies on electric energy stored in the first travel section;
operation of the motor train unit in the fourth travel section completely relies on electric energy stored in the third travel section;

operation of the motor train unit in the sixth travel section completely relies on electric energy stored in a fifth travel section; and such that, in the second, fourth, and sixth travel sections, neither an overhead contact system for power supply nor a support structure for a power supply network is required, and the motor train unit remains operable.

4. The electrified railway power grid system of claim 2, wherein, when the motor train unit runs into a second travel section, a fourth travel section, or a fifth travel section:

both the first and second double-phase pantographs fall, and operation of the motor train unit in the second travel section completely relies on electric energy stored in the first travel section;

operation of the motor train unit in the fourth travel section completely relies on electric energy stored in the third travel section;

operation of the motor train unit in the sixth travel section completely relies on electric energy stored in the fifth travel section; and such that, in the second, fourth, and sixth travel sections, neither an overhead contact system for power supply nor a support structure for a power supply network is required, and the motor train unit remains operable.

5. The electrified railway power grid system of claim 2, wherein:

none of a second travel section, a fourth travel section or a sixth travel section is provided with a traction power network; and tunnels, viaducts, station yards, and culverts are provided in the second, fourth, and sixth travel sections.

6. The electrified railway power grid system of claim 3, wherein:

none of a second travel section, a fourth travel section or a sixth travel section is provided with a traction power network; and tunnels, viaducts, station yards, and culverts are provided in the second, fourth, and sixth travel sections.

7. The electrified railway power grid system of claim 1, wherein:

the tension length supports and the positioners for cantilever provided on an outer side of the upline or the downline are respectively designed to be L-shape; and the tension length supports and the positioners for cantilever arranged between the upline and the downline are designed to be T-shape.

* * * * *